Figure 1:
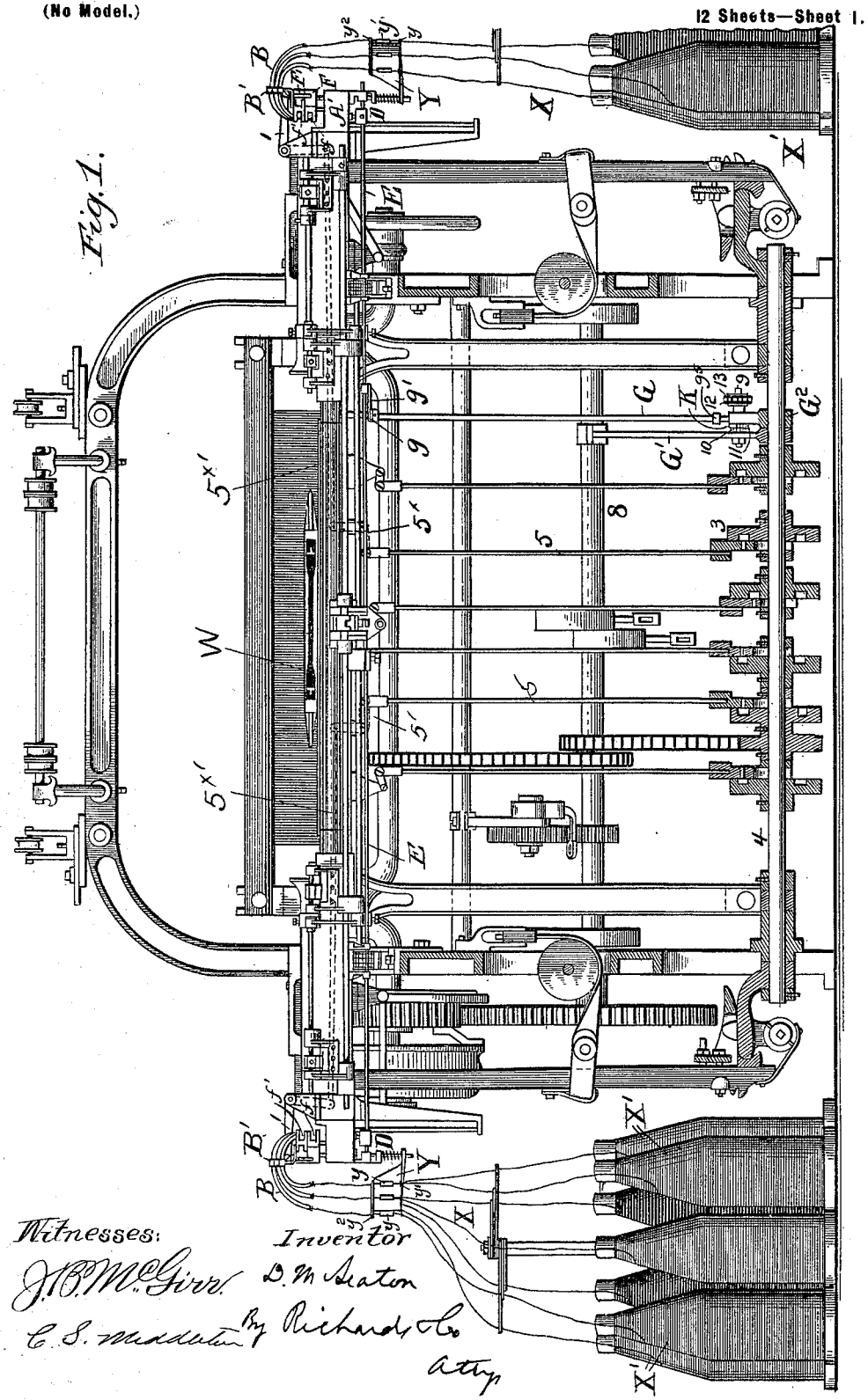

No. 669,553. Patented Mar. 12, 1901.
D. M. SEATON.
COLOR FEEDER FOR LOOMS.
(Application filed Apr. 7, 1898.)

(No Model.) 12 Sheets—Sheet 3.

No. 669,553. Patented Mar. 12, 1901.
D. M. SEATON.
COLOR FEEDER FOR LOOMS.
(Application filed Apr. 7, 1898.)

(No Model.) 12 Sheets—Sheet 4.

Witnesses:
J. B. McGirr.
C. S. Middleton.

Inventor
D. M. Seaton
By Richards &
Attys

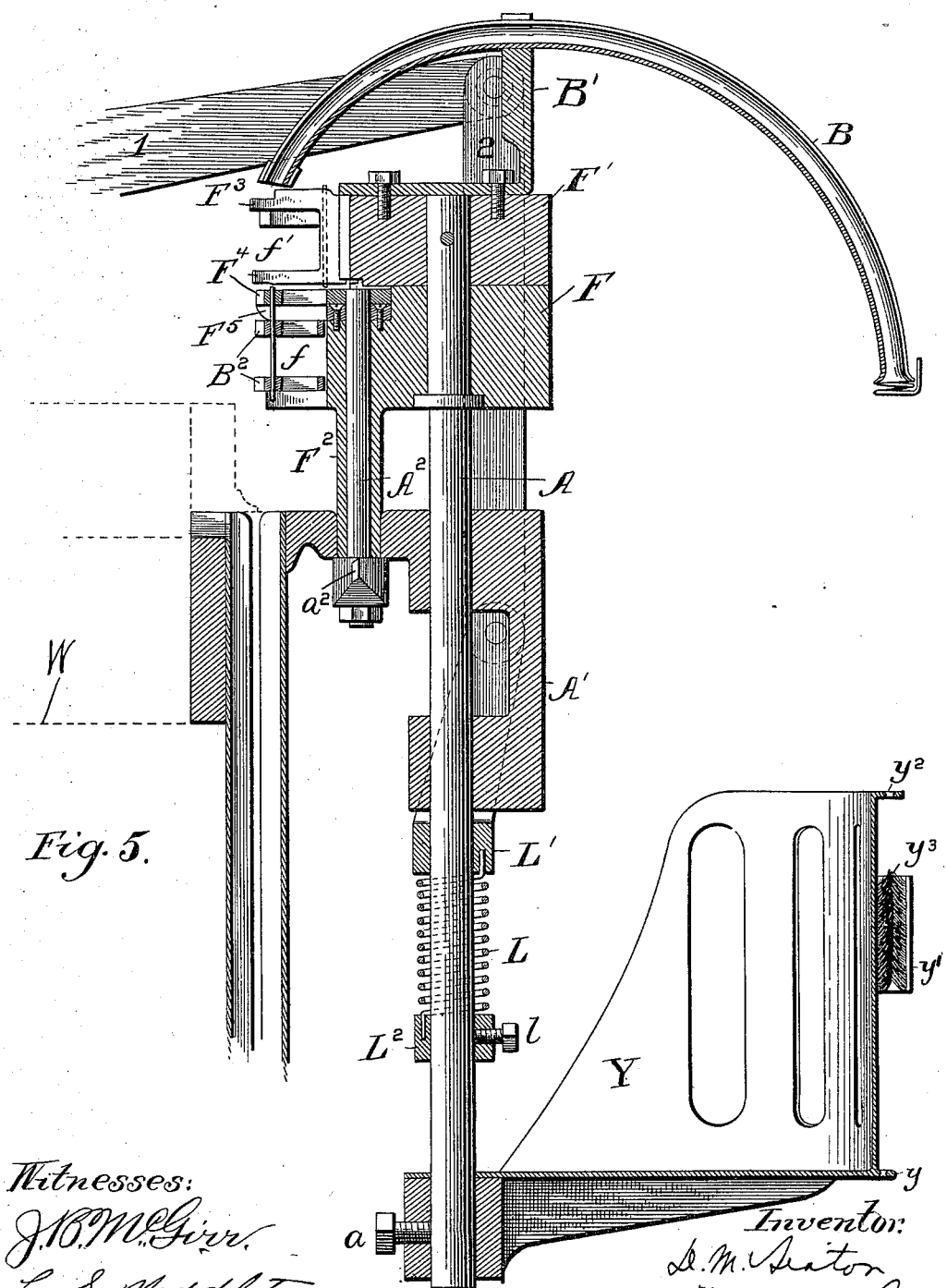

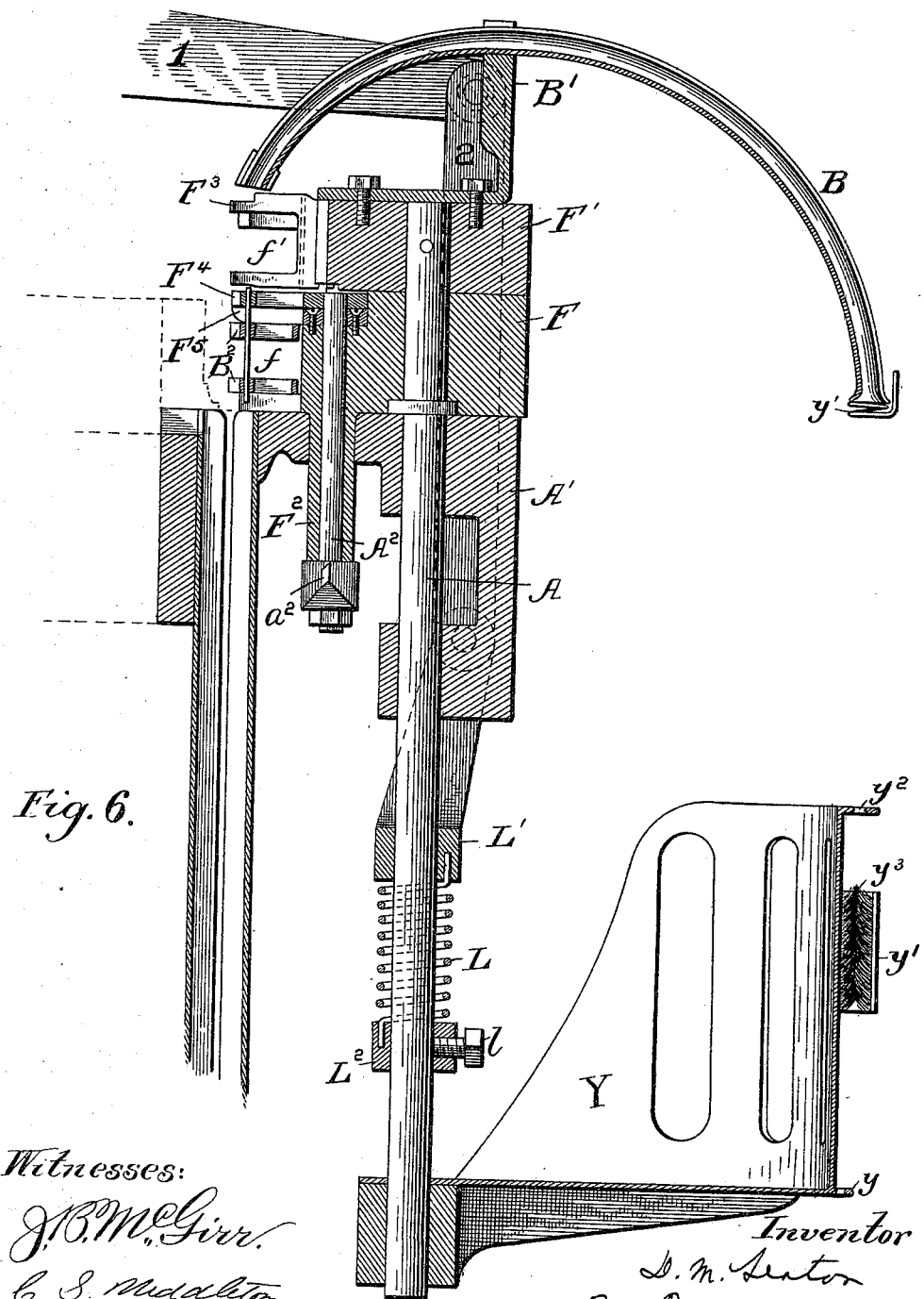

No. 669,553. Patented Mar. 12, 1901.
D. M. SEATON.
COLOR FEEDER FOR LOOMS.
(Application filed Apr. 7, 1898.)
(No Model.) 12 Sheets—Sheet 7.
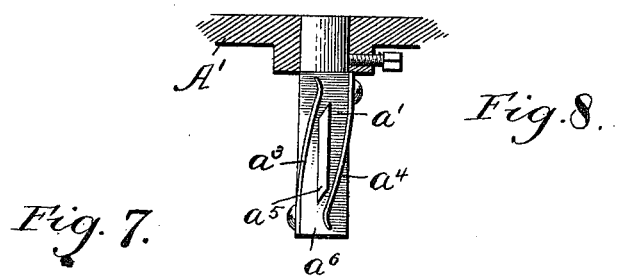
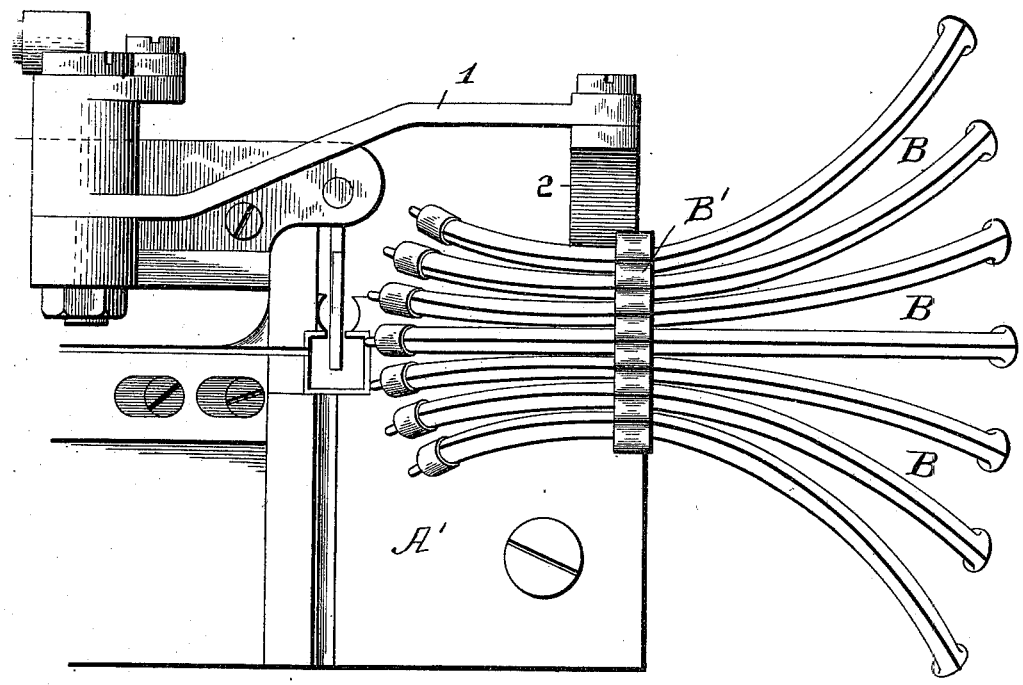
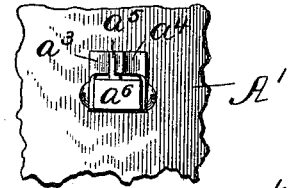

No. 669,553.
D. M. SEATON.
COLOR FEEDER FOR LOOMS.
(Application filed Apr. 7, 1898.)
Patented Mar. 12, 1901.
(No Model.)
12 Sheets—Sheet 8.
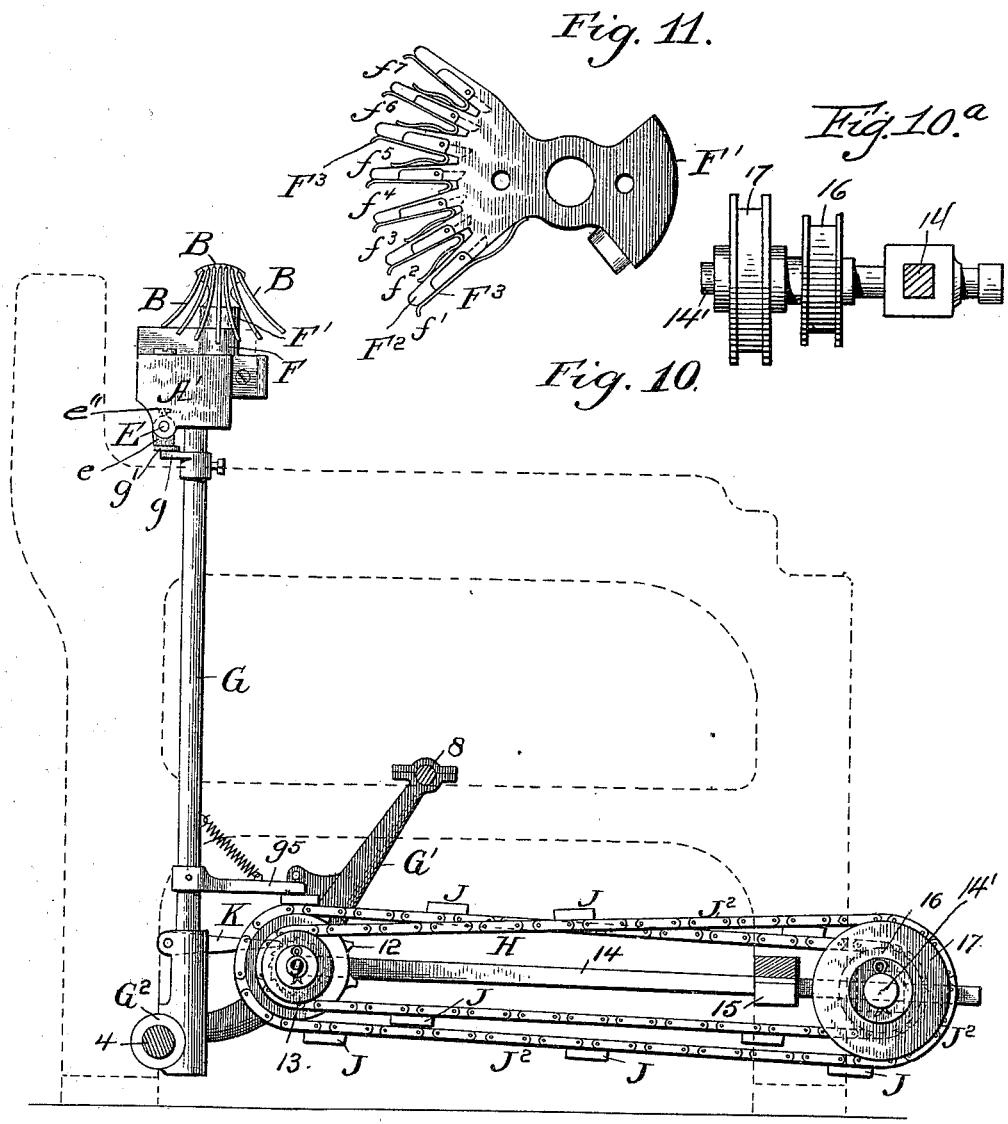

No. 669,553. Patented Mar. 12, 1901.
D. M. SEATON.
COLOR FEEDER FOR LOOMS.
(Application filed Apr. 7, 1898.)
(No Model.) 12 Sheets—Sheet 9.

Witnesses: Inventor
D. M. Seaton
By Richards & Co.
Atty.

No. 669,553. Patented Mar. 12, 1901.
D. M. SEATON.
COLOR FEEDER FOR LOOMS.
(Application filed Apr. 7, 1898.)
(No Model.) 12 Sheets—Sheet 10.

Witnesses:
J. B. McGinn.
C. S. Middleton.

Inventor
D. M. Seaton
By Richards & Co.
atty

No. 669,553. Patented Mar. 12, 1901.
D. M. SEATON.
COLOR FEEDER FOR LOOMS.
(Application filed Apr. 7, 1898.)

(No Model.) 12 Sheets—Sheet 11.

No. 669,553.　　　　　　　　　　　　　　　Patented Mar. 12, 1901.
D. M. SEATON.
COLOR FEEDER FOR LOOMS.
(Application filed Apr. 7, 1898.)
(No Model.)　　　　　　　　　　　　　　　12 Sheets—Sheet 12.
Fig. 23.
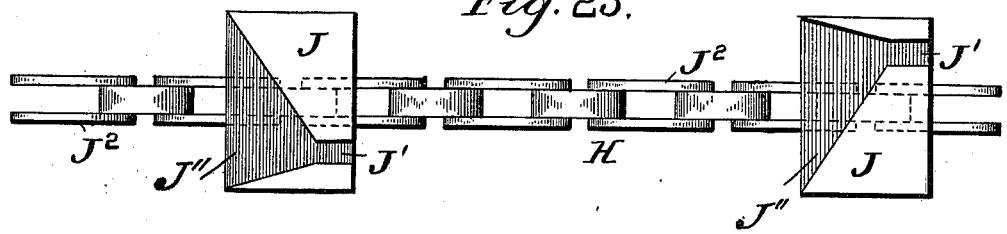
Fig. 24.
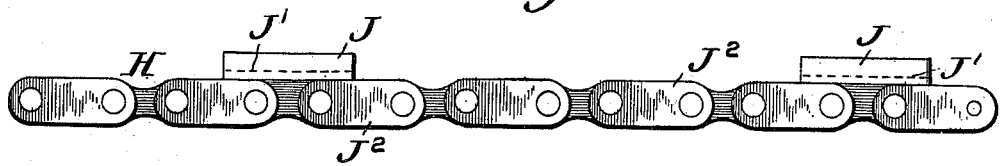
Fig. 25.　　　Fig. 26.　　　Fig. 27.
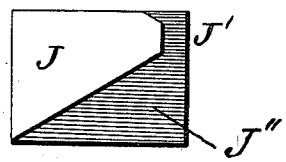 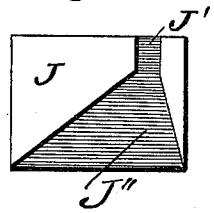 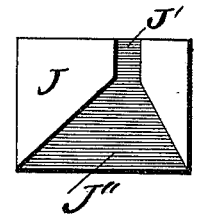
Fig. 28.　　　Fig. 29.　　　Fig. 30.
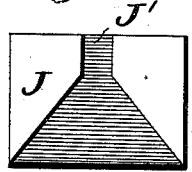 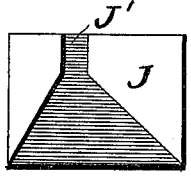 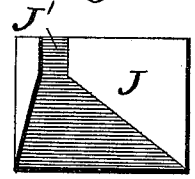
Fig. 31.
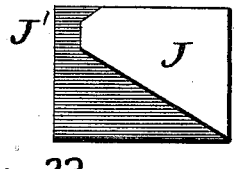
Witnesses:　　　　　　　　　　　　　　　Inventor.
J. B. McGivr.　Fig. 32.　　　　　　　　D. M. Seaton
C. S. Middleton　　　　　　　　　　　　By Richards
　　　　　　　　　　　　　　　　　　　　　Attys
THE NORRIS PETERS CO., PHOTO-LITHO., WASHINGTON, D. C.

UNITED STATES PATENT OFFICE.

DANIEL MUNSON SEATON, OF SAN FRANCISCO, CALIFORNIA.

COLOR-FEEDER FOR LOOMS.

SPECIFICATION forming part of Letters Patent No. 669,553, dated March 12, 1901.

Application filed April 7, 1898. Serial No. 676,816. (No model.)

*To all whom it may concern:*

Be it known that I, DANIEL MUNSON SEATON, a citizen of the United States, residing at San Francisco, in the State of California, have invented certain new and useful Improvements in Color-Feeders for Looms, of which the following is a full, clear, and exact specification.

My invention is an improvement on the loom disclosed by me in an application for Letters Patent of the United States, dated November 22, 1897, Serial No. 659,447, and relates particularly to means for feeding at will threads of different colors to the weft-thread carrier, so as to make a fabric of any desired pattern or of any desired combination of colored threads. In the loom referred to the weft-threads are laid in the fabric hairpin fashion, with the loops alternating at the opposite edges thereof, to form the selvage, and these loop lengths are measured and cut from the supply-thread and are fed to the weft-thread carrier by a reciprocating feeder, which presents first one end of the loop length to the weft-thread carrier and then the other.

My present invention relates particularly to feeding mechanism whereby different-colored loop lengths may be supplied to the weft-thread carrier.

Figure 2:
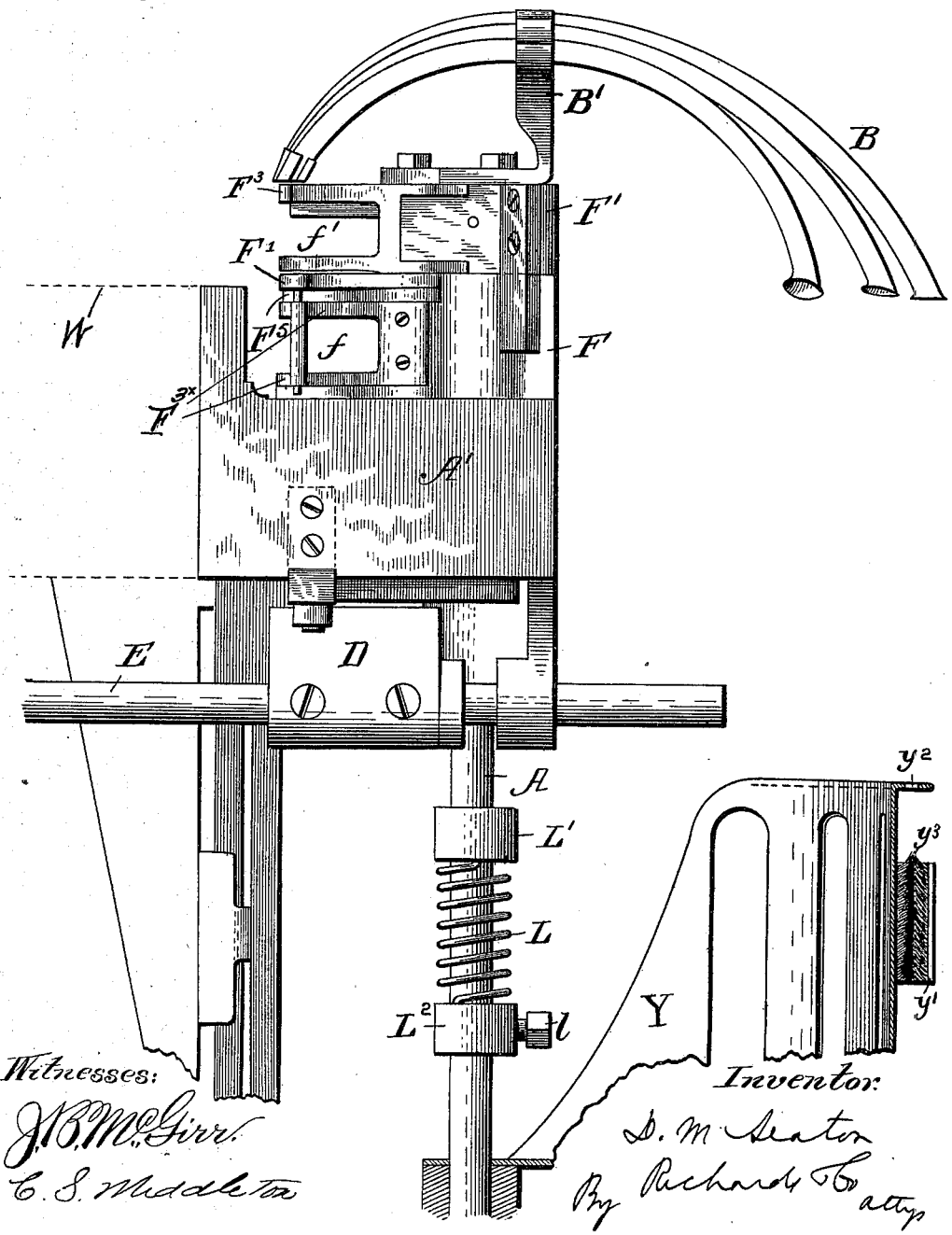
Figure 3:
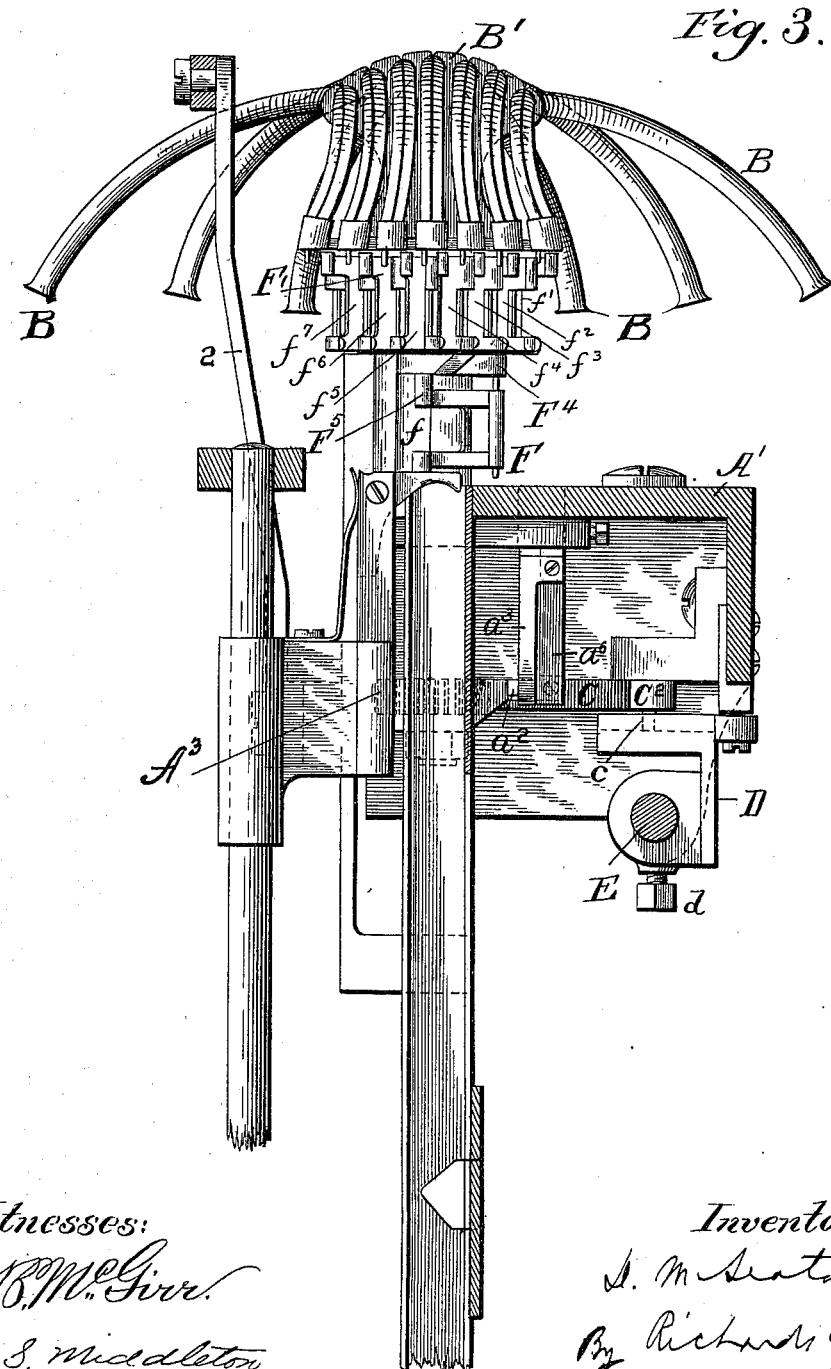
Figure 4:
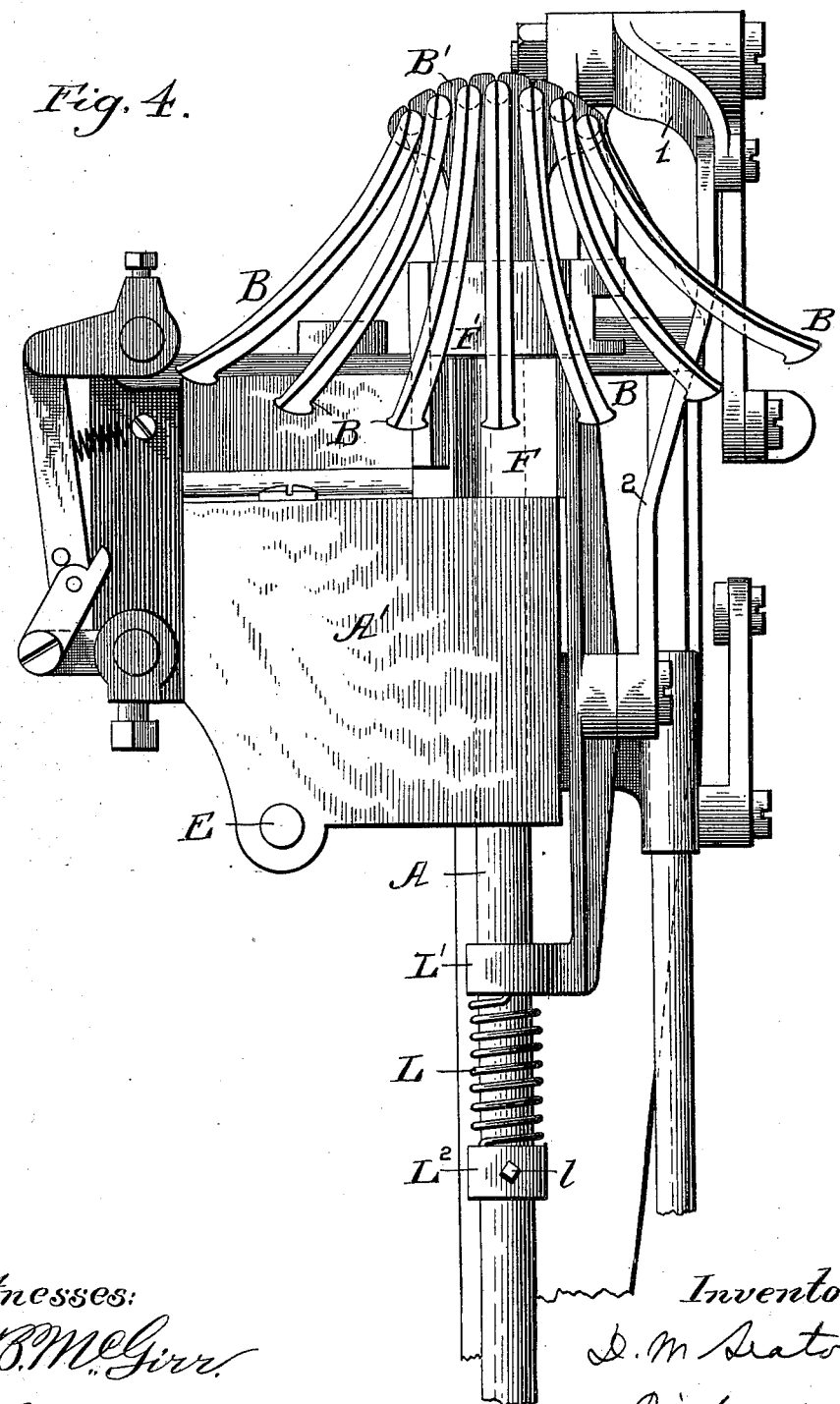
Figures 12, 13:
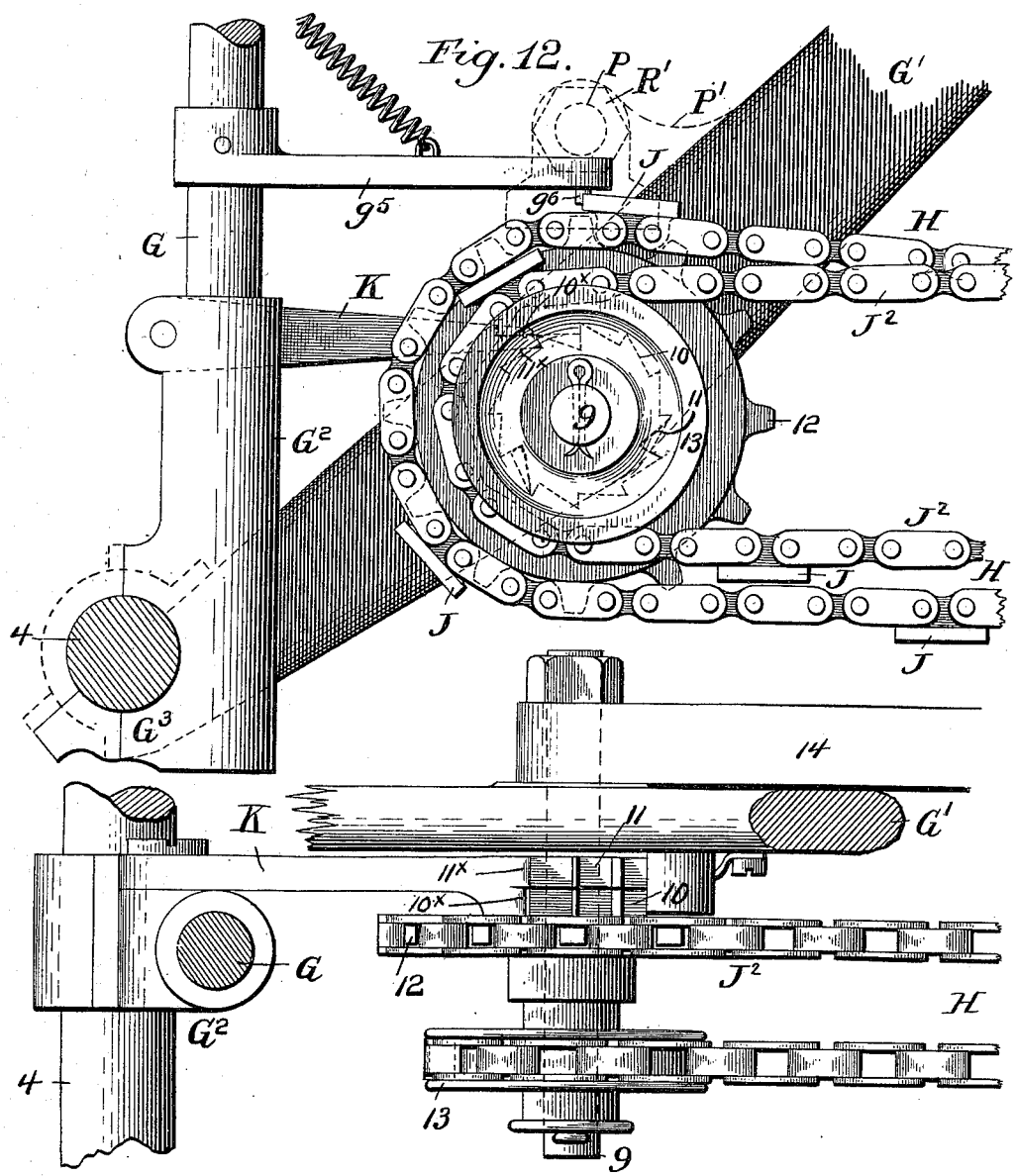
Figure 14:
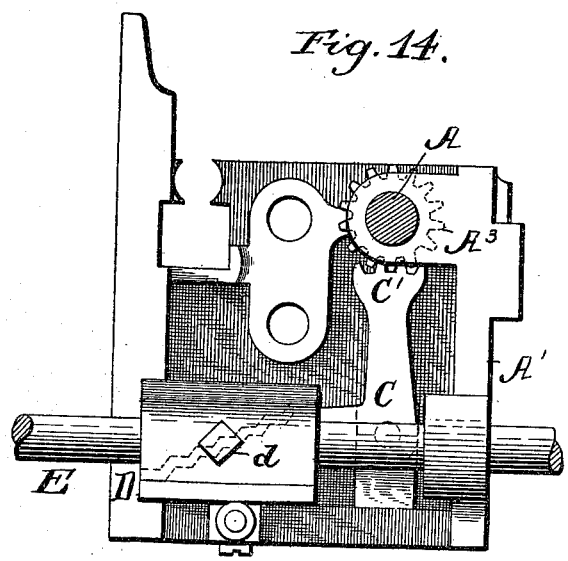
Figure 16:
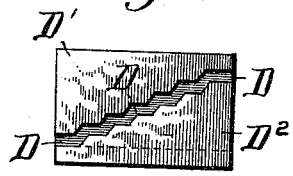
Figure 17:
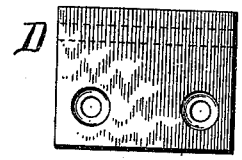
Figure 15:
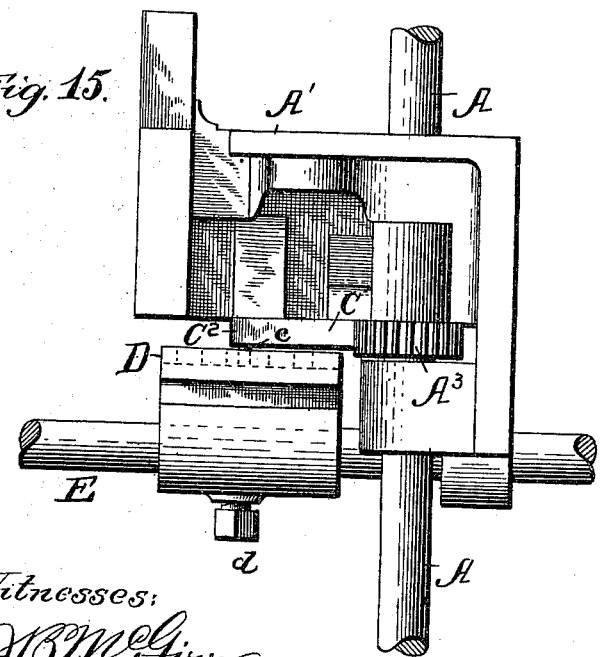
Figure 18:
Figure 19:
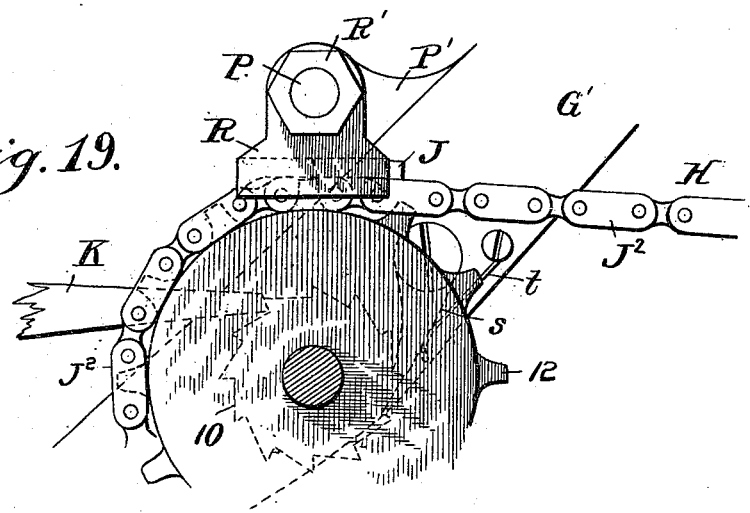
Figure 20:
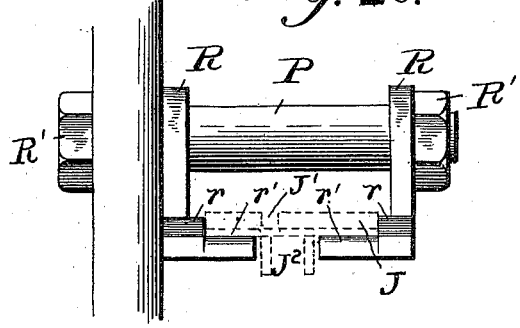
Figure 22:
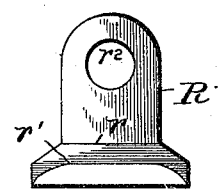
Figure 21:
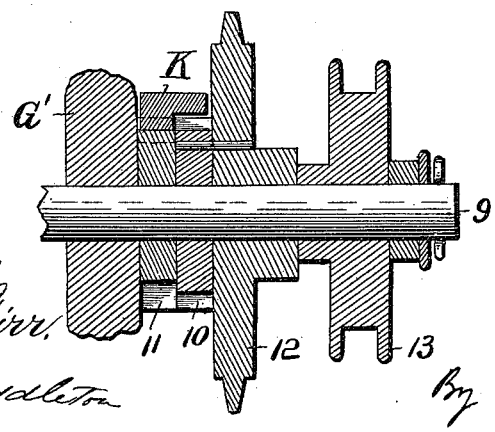

In the accompanying drawings, Figure 1 is a front elevation, partly in section, of the principal working parts of a loom with my improved color-feeders in place. Fig. 2 is a detail front elevation showing the feeder at the right-hand end of the beam, a part of the lower end of the feeder being broken away. Fig. 3 is a view of the color-feeder, partly in section, looking from the inside of the loom outwardly. Fig. 4 is an end view of the color-feeder, a part of the bottom parts being broken away. Fig. 5 is a central vertical section of my color-feeder, the two shafts being shown in full lines. This view shows the color-feeder in its uppermost position. Fig. 6 is a similar view of the color-feeder to that shown in Fig. 5; but the color-feeder in this view is in its lowermost position. Fig. 7 is a plan view of the feeder. Fig. 8 is a view showing the cam and springs which operate the shears. Fig. 9 is a detail plan view of the cam and springs shown in Fig. 8. Fig. 10 is a side elevation of the color-feeder, the pattern-chain, and operating mechanism connected therewith, the dotted lines indicating the side of the loom. Fig. 10ª is a detail view showing the adjustable supporting means for pulleys 16 17. Fig. 11 is a detail plan view of the upper half of my color-feeder, all the other parts being removed. Fig. 12 is an enlarged view of the lower portion of the shaft that moves the steps that control the movements of the upper half of the feeder and which carries the spring-controlled arm that engages with the pattern-chain. Fig. 13 is a plan view of the parts shown in Fig. 12. Fig. 14 is a detail view of a portion of the rotatable shaft that operates the upper half of the feed, the steps, and the elbow-lever which controls the movement of this shaft. Fig. 15 is an elevational view of the parts shown in Fig. 14. Fig. 16 is a front view of the steps as shown in Figs. 14 and 15. Fig. 17 is a rear view, and Fig. 18 an end view, of the steps. Fig. 19 is a detail view of the sprocket-wheel and pattern-chain, showing the chain-guide, and in dotted lines the pawl and wheels for controlling the movement of the chain. Fig. 20 is a detail view of the chain-guide. Fig. 21 is a sectional view of the sprocket-wheel and chain-pulley and the pawl and wheels for controlling the movement of the chain. Fig. 22 is a detail view of one of the guides for the chain. Figs. 23 to 32 are detail views of the chain and of the several links forming a part thereof which serve to operate the arm of the shaft which controls the movement of the color-feeder.

It should be observed that all the principal working parts of the loom may be and preferably are the same as those described in my application, Serial No. 659,447, above referred to, my present invention referring to improvements in the feeding device and the mechanism controlling the same and connected therewith, whereby I am enabled to supply to the weft-thread carrier at will and automatically threads of different colors, so that the loom can weave fabrics of any desired colors or patterns in colors or of any desired combinations of colors and also to determine or change such colors or patterns at will.

Referring now to the drawings, my improved color-feeder consists of the two parts F F'. The lower part F is provided, as in my prior application, with a single mouth $f$. The upper part F' is provided with as many mouths $f'$ $f^2$ $f^3$ $f^4$ $f^5$ $f^6$ $f^7$ as desired. As shown in the drawings, it has seven such mouths, which I have found in practice to be a convenient number. The color-feeder F F' is assembled upon and operated by a rock-shaft A, secured to the end of the working beam of the loom upon a casting A' and is operated in substantially the same manner as the color-feeder described in my former application, there being one of the color-feeders at each end of the loom. The lower part F of the color-feeder is provided with an elongated hollow stem or sleeve $F^2$, (see Figs. 5 and 6,) which passes through an opening in the casting A', which forms a bearing for the stem, permitting a free up-and-down reciprocating movement of the part F, as hereinafter more fully described. A shaft $A^2$ passes through the stem or sleeve $F^2$ and serves to open and close the shears of the feed. The upper part F' of the feeder is directly above and rests upon the part F and is attached to the rock-shaft A, which passes through, but is not secured to, the part F and is provided with suitable bearings in the casting A', as shown in Figs. 5 and 6. Both parts F F' of the feeder are given an up-and-down reciprocal motion, so as to alternately present the mouth $f$ of the part F and one of the mouths $f'$ $f^2$ $f^3$ $f^4$ $f^5$ $f^6$ $f^7$ of the part F' to the weft-thread carrier by the shaft A, the elbow-lever 1, and the link 2, which is operated by a cam 3 on the shaft 4 of the loom by means of the connecting-rod 5 and a suitable bell-crank lever and connecting-rod, as clearly shown in my aforesaid prior application, Serial No. 659,447, said bell-crank lever being indicated in Fig. 1 at $5^\times$ and the connecting-rod by $5^{\times'}$, these parts being shown in dotted lines. The link 2 is connected with a bracket, as shown in Fig. 4 of the drawings, which bracket terminates at its lower end in the sleeve L', which loosely encircles the shaft A. At its upper end the bracket is rigidly secured to the piece F and the shaft A is raised by the link 2, for the reason that said shaft passes through the part F and is rigidly attached to the part F', which latter rests upon the part F and is carried up with it, thus raising the shaft A.

The thread X for weaving is supplied from bobbins X', which may be placed at any convenient place at each side of the loom, a different bobbin being employed for each color used. The threads from the bobbins pass up through eyes $y$, formed in the lower edge of the thread-holder Y, which is secured to the lower end of the shaft A by the set-screw $a$, through the tension-clips $y'$, eyes $y^2$ in the upper edge of the thread-holder, and through a series of feed-tubes B, which conduct the threads X directly over the mouths of the upper part of the feed. The lower part of the feed F is provided with springs $F^{3\times}$, Fig. 2, which hold the thread between them and the bearing-surfaces $B^2$ at the top and bottom of the mouth $f$. The upper mouths comprise fingers $F^2$ and springs $F^3$, which hold the thread between them. The fingers $F^2$ radiate from the central shaft A, Figs. 5, 6, and 11, and the shaft A is turned, as hereinafter described, to bring the desired feeding-mouths $f'$ $f^2$ $f^3$ $f^4$ $f^5$ $f^6$ $f^7$ over the mouth $f$ and into position for the thread-carrier to take the thread therefrom. The fingers $F^2$ and springs $F^3$ form a part of the upper part F' of the feed. The series of feed-tubes B are carried in a bracket B', secured to the upper surface of the part F' of the feed. One of these feed-tubes projects over each finger $F^2$ with its corresponding mouth and conducts the thread thereto. The feed is provided with a shear $F^4$ $F^5$, which is located between the upper part F' and the lower part F of the feed, as shown in Figs. 2, 5, and 6, the movable member $F^4$ being attached to and operated by the rock-shaft $A^2$, to the lower end of which is attached an arm $a^2$, Figs. 5 and 6, which as the feed is given a vertical movement up and down engages a cam-path $a'$, Figs. 8 and 9, formed by a pair of springs $a^3$ $a^4$ and a central rib $a^5$ on an arm $a^6$, which is secured to the casting A' and cuts the thread X at the proper times into loop lengths, as described in my prior application before mentioned.

As above stated, both the parts F F' are given a vertical movement up and down in unison, so as to present first one of the series of mouths and then the single lower mouth to the thread-carrier. It is, however, necessary to present one and then another of the mouths $f'$ $f^2$ $f^3$ $f^4$ $f^5$ $f^6$ $f^7$ to the thread-carrier, according to the color of the thread to be used, and to be able to present any one of them at any time and as desired. I accomplish this by the following construction and combination of parts: The upper part F' of the feed is provided with, say, seven mouths and seven feed-tubes, each tube and mouth containing a thread of a color different from the others. The part F' is attached to the perpendicular rock-shaft A, which is caused to rock back and forth by the elbow-lever C, which is suitably pivoted in the casting A', (see Figs. 3, 14, and 15,) the end C' of which is toothed, engaging with a toothed wheel $A^3$, fixed on the shaft A. At the other end $C^2$ of the elbow-lever C is a pin $c$, which engages in a series of steps D, formed in the two blocks D' $D^2$, one step D for each of the mouths $f'$ $f^2$ $f^3$ $f^4$ $f^5$ $f^6$ $f^7$. The blocks D' $D^2$ are secured, by means of set-screws $d$, upon a rod E, which runs along the work-beam W, from end to end thereof, each end of the rod E being provided with these blocks D' $D^2$, with their steps D and connecting mechanism, as above described. The rod E, upon which the steps D are fastened, is worked backward and forward lengthwise of the working beam by means of the upright shaft G, as hereinafter described, and as it carries the steps D backward and forward with it the elbow-lever is moved by means of its pin $c$, which rides up and down the steps D, and the toothed end C' of the lever through the gear A$^3$ rotates the shaft A. It will be obvious, therefore, that as the steps D correspond with the mouths $f'$ $f^2$ $f^3$ $f^4$ $f^5$ $f^6$ $f^7$ any of these mouths may be presented to the thread-carrier of the loom simply by causing the pin $c$ to stop upon the proper step D.

On the shaft 4 is mounted loosely a bracket G$^2$, in the upper end of which the vertical shaft G has its bearing. The upper end of the said shaft G is provided with the arm $g$ and the link $g'$, the latter being connected to rod E by a sleeve $e$, which is fixed adjustably to the rod E by a set-screw $e''$, Fig. 10. Upon bracket G', which is loosely mounted on both the shaft 4 and the main driving-shaft 8 of the loom, is supported a stud 9, carrying the toothed wheels 10 11, the sprocket-wheel 12, and the pulley-wheel 13. A bar 14 extends from the bracket G' to the back of the loom, being supported near its other end by a cross-piece 15 of the loom, and carries a stud 14', having the pulley-wheels 16 17 suitably mounted thereon. The pulley-wheels 16 17 are adjustable on the bar 14 and so arranged that the pulleys may be moved backward and forward on the bar 14 and be screwed thereupon at any desired position, thus enabling the use of a chain H of any desired length. The chain H passes over the pulleys 16 17 and the sprocket-wheel 12 and pulley 13.

At a point upon the vertical shaft G just a little above the sprocket-wheel 12 is secured the arm $g^5$, extending toward the back of the loom and carrying at its outer end the depending pin $g^6$. The pin $g^6$ is adapted to engage with the slots formed in the pattern-links J of the chain H, and as the chain H is caused to travel by the mechanism hereinafter described the pin $g^6$ will engage with one link J after another on the chain H. The links J are provided with slots J' in their upper surfaces (see Figs. 23 and 25 to 32) in seven different positions or in as many different positions as there are steps D or mouths in the upper part F' of the feed. Fan-shaped channels or ways J'' are also formed in the upper part of the links J, leading to the slots J', so that no matter at what point on the links J the pin $g^6$ may strike it will be directed to and pass through the slots J'. As the pin $g^6$ passes into the slot J' it moves the arm $g^5$, and consequently turns the shaft G the one way or the other, according to the position of the slot J' upon the link, and as the pin $g^6$ passes out of the slot it leaves the shaft G in the position which it assumed when the pin $g^6$ entered the slot, and it will remain in that position by reason of the steps D until the pin $g^6$ enters the slot in another link J and is moved thereby. The movement thus conveyed to the shaft G is sufficient to just move the feed from one position to any other that may be necessary to present the desired color of thread to the thread-carrier.

The links J of the chain H are the pattern-links. The links J$^2$ are ordinary links engaging with the teeth of the sprocket-wheel 12. I make them answer another purpose as well—to count the number of threads taken of each color from the feeder by the thread-carrier. To do this, I make each link J$^2$ represent four threads woven in the cloth or four beats of the lay, so that the number of links J$^2$ between each two adjoining pattern-links J multiplied by four will give the number of threads of that color taken by the thread-carrier into the cloth. I accomplish this as follows: The upright shaft G reaches from the shaft 4 to the lay of the loom and moves backward and forward with the lay, the lower end of the shaft G moving a correspondingly less distance as it approaches the shaft 4, upon which it is mounted.

The lower end of the shaft G is supported by a sleeve G$^2$, which is provided with a lug G$^3$, having an opening through which the shaft 4 passes. To the upper part of the sleeve G$^2$, I attach a pawl K, which extends toward the back of the loom, parallel with the arm $g^5$, and engages with the toothed wheels 10 and 11, one of which, 10, is secured to the sprocket-wheel 12, the other of which, 11, is loosely mounted on the rod 9. Both of these wheels have the same number of teeth; but the teeth on the wheel 11 are of unequal depth, every fourth tooth being deeper than the three preceding ones, so that the end of the pawl K, which has high and low bearing or catching edges 10$^\times$ 11$^\times$ working in these two wheels 10 and 11, respectively, will during three beats of the lay work on three teeth of the loose wheel 11, the height of these teeth being such that the pawl, by engaging with its bearing edge 11$^\times$ the wheel 11, will prevent the edge 10$^\times$ from engaging with the teeth on the wheel 10, but will at the next beat of the lay drop into the fourth or deep tooth in the wheel 11 and at the same time, by means of its edge or bearing 10$^\times$, will drop into a tooth on the wheel 10, which is secured to the sprocket-wheel, so that the latter, and consequently the chain H, will be caused to travel a distance measured by one link J$^2$ every time the pawl K enters the fourth deep tooth on the wheel 11 and a tooth on the wheel 10 or, in other words, at every fourth beat of the lay. Consequently in order to weave four threads of a certain color into a cloth or a multiple of four it is only necessary to insert in the chain H after the proper link J to feed the desired color a link J$^2$ for every four threads of the color desired and then to insert another link J to give the next color desired, and so on, thus making the pattern-chain long enough to give the colors and pattern wished for. It will be noticed that the pawl K acts on the toothed wheel to move the chain on the backward movement of the lay and rock-shaft G, and this same movement brings the pin $g^6$ of the arm $g^5$ into line with the fan-shaped way of the links J.

It should be understood that there is no need of a sequence or rotation in a certain order of the colors fed by my improved feeder, for by using proper links J any color may follow any other color, as desired, the slots J' turning the shaft G, by means of the pin $g^6$ and arm $g^5$, just the right distance to cause the mouth of the upper part F' of the feeder to present the color desired to the thread-carrier. It should be noticed that the pattern may be of any number of threads, and this is accomplished by putting in or taking out links from the chain.

The steps D, which move the elbow-lever C, which controls the movements of the shaft A, which carries the upper part F' of the feeder, are formed in the two blocks D' D², (see Fig. 16,) the steps in upper block D' and the lower block D² corresponding, so that the pin $c$ on the end C² of the elbow-lever may move easily up and down from one step to another, or only one of these blocks—the lower block D²—may be employed, but in the latter case a torsional spring L (see Figs. 1, 2, 4, 5, and 6) must be used, one end of the torsional spring L being secured to some outside support—as, for example, the sleeve L'—while its other end is secured to the sleeve L², which is secured to the shaft A by a set-screw $l$. In this case while the shaft A is moved to the one side or the other by the elbow-lever C the spring L will keep the pin $c$ in constant engagement with the steps D. If the upper block D' of the steps D is used alone, the spring L will also be used to hold the elbow-lever against the steps.

In order to hold the chain H securely in the proper position while the pin $g^6$ is passing through the links J and to prevent any side motion of the chain, I provide guides for the same, consisting of the guide-plates R R on the bolt P, which is held by a lug P' on the bracket G'. (See Figs. 19, 20, and 22.) The two ends of the bolt P are made of a smaller diameter than the central portion, (not shown,) and the holes $r^2$ in the guide-plates R are made of a proper size, so that they will just permit the smaller ends of the bolt P to pass therethrough, but not the central portion thereof, so that when the guide-plates R R are placed in position on the bolt P and the latter is secured in place in the lug P' the guide-plates R R will be held rigidly in place by the nuts R', one of which also secures the bolt in the lug P'. The guide-plates are formed approximately L-shaped, with a channeled portion $r'$ and a shoulder $r$. The chain H passes between the shoulders $r\ r$. The links J rest in the channel formed by the portions $r'$, the shoulders $r\ r$ preventing any sidewise motion of the chain H as the pin $g^6$ passes in and through the slots J', which takes place while the chain is held between the guide-plates R R.

The tension-clips $y$ of the thread-holder Y are provided with suitable packings $y^3$, consisting, preferably, of strips of plush or similar fabric, as I have found such packings give excellent results, acting as a drag and giving just the required tension to the threads.

I have not thought it necessary to describe the thread-carrier, the measurer, and the other working parts of the loom, as these form no part of my present invention, which is directed exclusively to the feeder and the means of controlling and operating the same, and, moreover, all these parts will be found fully described and illustrated in my application Serial No. 659,447, hereinbefore referred to.

The step-blocks D' D² form a supplemental pattern device between the rock-shaft A and the pattern mechanism.

I claim—

1. In combination in a loom, the shuttle-race, feeding means for presenting first one end of a loop length to the shuttle and then the other, said feeding means comprising a single feed-mouth, a series of feed-mouths, means for bringing the mouths of the series into line with the mouth first mentioned, and means for bringing the feed-mouths in proper order into line with the shuttle-race, substantially as described.

2. In combination, the lay having a shuttle-race, a single feed-mouth, a series of feed-mouths with means for adjusting them in relation to the mouth first mentioned, means for shifting the mouths so that in one position one of the series of mouths will be in line with the shuttle-race to present one end of a loop length to the shuttle and in the other position the single mouth will be in line with the shuttle-race to present the other end of the loop length to the shuttle, the adjustment of the series permitting the feeding of threads of different colors, substantially as described.

3. In combination with a lower feed-mouth, a series of upper feed-mouths, and means for shifting said upper series to bring different mouths into position over the lower feed-mouth, both the upper and lower feed-mouths having means for holding the yarn.

4. In combination with a lower feed-mouth, a series of upper feed-mouths, a series of tubes corresponding to the upper feed-mouths and means for shifting the upper feed mouths and tubes to bring different mouths into line with the lower mouth, substantially as described.

5. In combination, the lower feed-mouth, the series of upper mouths adapted to be shifted to bring any one of the upper mouths to act in conjunction with the lower mouth, means for directing the threads to the mouths of the shifting series, and pattern mechanism for controlling the position of the shifting series, substantially as described.

6. In combination, the lower feed-mouth, a shifting series of upper feed-mouths, means for raising the feeder vertically, pattern mechanism for shifting the upper feed-mouths, and means for bringing the pattern mechanism into and out of action, substantially as shown and described.

7. In combination, the lower feed-mouth, the series of upper mouths adapted to be shifted to bring any one of the upper mouths to act in conjunction with the lower mouth, means for directing the threads to the mouths of the shifting series, pattern mechanism for controlling the position of the shifting series, and a connection between the said pattern mechanism and the lay whereby the pattern mechanism will be operated by the movement of the lay, substantially as described.

8. In combination in a feeding mechanism for looms, the lower feeder-mouth, the series of upper mouths, the shifting support therefor, the steps and lever for moving the support, and the pattern mechanism for operating said steps and lever and for shifting said upper mouths to present the desired colored thread to the thread-carrier, substantially as shown and described.

9. In combination, the lower feed-mouth with means for holding it against lateral movement and with means for raising it vertically, an upper feeder movable vertically with the carrier of the lower feed-mouth, said upper feeder having lateral shifting movement and having fingers and springs forming a series of feeder-mouths, the shaft, connected with the upper feeder, a lever connected with the shaft, steps in connection with the lever, said lever and steps controlling the shifting of the upper feeder-mouths, and pattern mechanism for imparting movement thereto, substantially as shown and described.

10. In a loom, a lower feed-mouth, a series of upper feed-mouths adapted to be shifted latteally, a rock-shaft supporting the upper mouths and means for oscillating said rock-shaft comprising a series of steps corresponding in number to the number of feed-mouths with operating connections between the steps and the rock-shaft and a pattern mechanism for controlling the movement of the steps, substantially as described.

11. In combination with the rock-shaft and the series of mouths carried thereby to shift in the arc of a circle, a relatively-fixed mouth with which the mouths of the series aline separately, means for moving the rock-shaft comprising an elbow-lever C engaging the rock-shaft at one end, a series of steps engaging the opposite end of the lever C and controlling the amount of movement of the rock-shaft and a pattern mechanism controlling the movement of the steps, substantially as described.

12. In combination, the single feed-mouth at each end of the lay, a series of feed-mouths above the same and arranged radially about a pivoting-point, a rock-shaft at the pivoting-point connected with the series of mouths, a series of steps, a connection therefrom to the rock-shaft, a rod E extending from end to end of the lay and carrying the steps at each end, and means for moving the rod including pattern mechanism whereby the series of mouths will be moved in the arc of a circle to make them aline with the single mouth, substantially as described.

13. In combination with the rock-shaft and the upper feed-mouths carried thereby and movable in the arc of a circle, a series of steps with connections therefrom to the rock-shaft, a rod E extending from end to end of the lay and carrying the steps, a rock-shaft G connected and moving with the lay and in operative connection with the rod E and a pattern mechanism directly controlling the operation of the shaft G, substantially as described.

14. In combination with the rock-shaft A and the upper feed-mouths carried thereby, an elbow-lever C having a toothed end, a spur-wheel on the shaft A engaged by the toothed end, a series of steps engaging the opposite end of the lever C, a rod E carrying the steps and movable longitudinally to operate the elbow-lever through the steps, a shaft G connecting with the rod E at one end and pattern mechanism connected with the shaft G, substantially as described.

15. In a loom the lay, a color-feeder and a pattern mechanism controlling this feeder, said pattern mechanism comprising a chain with a series of pattern links carried thereby, said links having flaring mouths, an oscillating rock-shaft G in connection with the lay to move therewith and connected also with the color-feeder and an arm carried by said shaft in the path of the several pattern-links and adapted to be shifted thereby to different degrees, substantially as described.

16. In a loom the lay, in combination with a color-feeder, a rock-shaft G connected with the lay to oscillate therewith, a pattern-chain, pattern-links carried thereby having flaring mouths, an arm $G^5$ secured to the shaft G and having its end arranged in the path of the pattern-links whereby the said arm is shifted to one side or the other by the flaring mouths thereby turning the shaft G, mechanism for controlling the pattern mechanism and a pawl K for actuating this mechanism in the back-and-forth movement of the lay, substantially as described.

17. In a loom, a color-feeder, an oscillating rock-shaft G connected with the lay to move therewith having operating connections with the color-feeder, a pattern-chain for rocking the shaft G, means carried by the shaft to contact with the chain and a guide to prevent lateral displacement of the chain, said guide engaging the chain adjacent to its point of contact with the means on the rock-shaft, substantially as described.

18. In a loom and in combination with a color-feeder comprising a single mouth, a series of upper mouths, means for holding the yarn in the mouths, a rock-shaft A connected with the upper series of mouths, a pattern mechanism, a supplemental pattern device intermediate of the pattern mechanism and the rock-shaft and means for shifting the mouths to cause one of the series of mouths to present one end of a loop length to the shuttle in one position and to cause the other end of the loop length to be presented by the single mouth, substantially as described.

19. In a loom, a lower feed-mouth, a series of upper feed-mouths and means for moving the upper and lower mouths vertically, consisting of a lever 1 and link 2, a cam and operating connections between the cam and the lever 1, substantially as described.

20. In a loom, a lower feed-mouth, a series of upper feed-mouths, a rock-shaft movable vertically to raise and lower the feed-mouths, a supplemental shaft $A^2$ carried by the lower mouth, a shear actuated by said shaft and a cam for giving movement to the shaft $A^2$ in the vertical movement of the mouths, substantially as described.

21. In combination, a lay with a shuttle-race, a feed-mouth, a series of feed-mouths adjacent thereto with means for moving said series to bring them into coöperative position with the first-mentioned feed-mouth, all of the feed-mouths having a movement into and out of line with the shuttle-race, substantially as described.

22. In combination, the shuttle-race, a feed-mouth, a series of feed-mouths to coöperate separately therewith, a shaft connected with the mouths, means for operating the same to position the mouths of the series in proper relation to the first-mentioned feed-mouth, and means for giving said shaft a longitudinal movement to move the mouths into and out of line with the shuttle-race, substantially as described.

23. In combination, the single feed-mouth, a series of feed-mouths, a shaft connected to the said mouths, a gear $A^3$ on the shaft, means for turning the gear to adjust the series of mouths and means for giving the shaft a longitudinal movement, substantially as described.

24. In combination, the single feed-mouth, a series of feed-mouths, means for adjusting the series in relation to the single mouth, and cutter means between the single mouth and the series of mouths, substantially as described.

25. In combination, the upper and lower feed-mouths, means for moving them across the shuttle-race, a cutting-knife between them, a rock-shaft connected thereto, and a cam for operating the rock-shaft to actuate the cutter, substantially as described.

26. In combination, the lay, a series of feed-mouths, a shaft G extending downwardly from the lay and oscillating therewith, pattern mechanism, a connection between the same and the lay to be operated by the movement thereof, a connection between the pattern mechanism and the shaft G and connections from the shaft G to the feed-mouths, substantially as described.

27. In combination, the lay, a series of feed-mouths, a rod E connected thereto and extending longitudinally of the lay, a shaft G extending downwardly from the lay and oscillating therewith, a connection between the shaft and rod E and pattern mechanism for operating the shaft G, substantially as described.

In witness whereof I have hereunto set my hand in presence of two witnesses.

DANIEL MUNSON SEATON.

Witnesses:
H. L. BEIL,
W. H. HOLBROOK.